(12) United States Patent
Werbus

(10) Patent No.: US 6,188,908 B1
(45) Date of Patent: *Feb. 13, 2001

(54) WIRELESS COMMUNICATION SYSTEM WITH RADIO CHANNELS FOR CONNECTION

(75) Inventor: Volker Werbus, Gilching (DE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/878,352

(22) Filed: Jun. 18, 1997

(30) Foreign Application Priority Data

Jun. 28, 1996 (DE) .............................. 196 25 814

(51) Int. Cl.[7] ................. H04B 7/15; H04Q 7/20
(52) U.S. Cl. ............... 455/465; 455/11.1; 455/426; 455/464; 370/315
(58) Field of Search ................. 455/422, 426, 455/432, 436, 450, 459, 462, 463, 464, 509, 552, 553, 554, 555, 560, 561, 11.1, 465; 370/331, 328, 315

(56) References Cited

U.S. PATENT DOCUMENTS

| | | |
|---|---|---|
| 5,133,001 | 7/1992 | Bohm . |
| 5,152,002 * | 9/1992 | Leslie et al. ............ 455/11.1 |
| 5,311,570 * | 5/1994 | Grimes et al. .......... 455/555 |
| 5,408,679 * | 4/1995 | Masuda ................... 455/11.1 |
| 5,442,681 * | 8/1995 | Kotzin et al. ........... 455/450 |
| 5,517,550 * | 5/1996 | Kobayashi .............. 455/560 |
| 5,544,226 * | 8/1996 | Weis et al. .............. 455/555 |
| 5,598,412 * | 1/1997 | Griffith et al. .......... 455/560 |
| 5,608,780 * | 3/1997 | Gerszberg et al. ..... 455/450 |
| 5,613,200 * | 3/1997 | Hamabe .................. 455/450 |
| 5,659,598 * | 8/1997 | Byrne et al. ............. 455/553 |
| 5,664,005 * | 9/1997 | Emery et al. ............ 455/450 |
| 5,794,147 * | 8/1998 | Hunang .................. 455/552 |
| 5,799,250 * | 8/1998 | Veloso et al. ........... 455/552 |
| 5,862,492 * | 1/1999 | Leppanen et al. ...... 455/560 |
| 5,890,054 * | 3/1999 | Logsdon et al. ........ 455/11.1 |
| 5,907,540 * | 5/1999 | Hayashi .................. 455/11.1 |

FOREIGN PATENT DOCUMENTS

| | | |
|---|---|---|
| 4207748 | 9/1993 | (DE) . |
| 0661895 | 7/1995 | (EP) . |
| 9503663 | 2/1995 | (WO) . |

OTHER PUBLICATIONS

"Mobile Datenkommunikation—Eine Übersicht" by Walke, et al. In Informationstechnik und Technische Informatik 35 (1993) 5, pp. 12–25.

* cited by examiner

*Primary Examiner*—Nay Maung
(74) *Attorney, Agent, or Firm*—Ware, Fressola, Van Der Sluys & Adolphson LLP

(57) ABSTRACT

A cellular radio system is to be implemented in an existing facility which performs switching functions and provides service features, without requiring major changes therein. Communication between the individual base stations (BS1, BS2, BS3, BS4) takes place by means of radio via existing radio channels. A cordless terminal (HS1) is assigned to a base station. If the terminal is located in the area of another base station during an incoming call, the terminal is searched for via a radio channel between the base stations. If it is found in the area of the other base station, the call is handed over to this other base station. The same applies to outgoing calls and to other functions.

8 Claims, 2 Drawing Sheets

WIRELESS COMMUNICATION SYSTEM WITH RADIO CHANNELS FOR CONNECTION

TECHNICAL FIELD

The invention concerns a cellular radio system built up of existing facilities which perform switching functions and provide a number of service features, as well as base stations and cordless terminals.

BACKGROUND OF THE INVENTION

Cellular mobile radio networks which expand the telephone service of wired networks to mobile subscribers are already known in the state of the art. Telephone systems with so-called cordless telephones have great significance for use in the private sector. The generally known GSM network expands the services offered by the introduced ISDN network to the mobile areas. Said network is designed for high compatibility with the ISDN network.

The other country-wide mobile radio systems which provide an expansion to the radio area of the services offered by existing wired networks are described in more detail in the following.

Cordless telephones offer a service which is available above all in the area of the subscriber's main station. It enables the telephone terminal to be connected by radio instead of by cable to a fixed station up to 300 m outside of the building or 50 m inside of the building. To that end the fixed station and the telephone terminal as the mobile part are each equipped with a transmitting and a receiving facility. The current DECT (Digital Enhanced Cordless Telecommunications) standard describes the protocols in a cordless telecommunications system for voice and data transmission. This system is also interesting for broad application in private branch exchanges. The DECT standard does not provide for any mobility management. The subscriber is mostly supplied inside of buildings, while in multi-cell networks such as for example the GSM network, the subscribers are predominantly reached outside of buildings. Several expansion steps are known with DECT installations. There are so-called one-cell systems which cover the supply area with only one fixed station. Due to the established low transmission capacity and the high attenuation inside of buildings, one-cell systems can be imagined for private internal use in buildings.

Multi-cell systems allow using the DECT service in larger areas, such as in one or more buildings within a private company territory (from: "An Overview of Mobile Data Communications") by B. Walke et al; it+ti 5/93 Information Technology and Technical Informatics 35 (1993); p. 12 to 25).

The previously cited multicell systems however require a controller for switching the different base stations to a TK installation since, as already mentioned, no mobility management is provided by the DECT standard. Even a direct link to a network requires a line-side connected logic circuit.

SUMMARY OF THE INVENTION

This means therefore an additional expense when installing a cellular radio system in an existing telecommunications facility, or in an existing telecommunications network. Accordingly it is the task of the present invention to create a cellular radio system in a way to enable its implementation in an existing telecommunications facility without the need to make major changes therein. The invention fulfills this task via a cellular radio system with a facility which performs switching functions and which makes available a plurality of service features, with a plurality of base stations that each have cordless terminals assigned to them, and at least one of which is connected to the facility, wherein each base station makes available a plurality of radio channels, and wherein a connection between neighboring base stations via one of the radio channels is used to access the facility via those base stations to which the cordless terminal is not assigned.

The present invention demonstrates that a cellular network can be established in spite of reduced costs and without the need to make large changes for the new installation in the facility. It is furthermore advantageous that the range can be extended with very cost-effective means.

BRIEF DESCRIPTION OF THE DRAWINGS

The invention is explained in greater detail in the following by means of configuration examples and figures where.

BEST MODE FOR CARRYING OUT THE INVENTION

Figure 1:
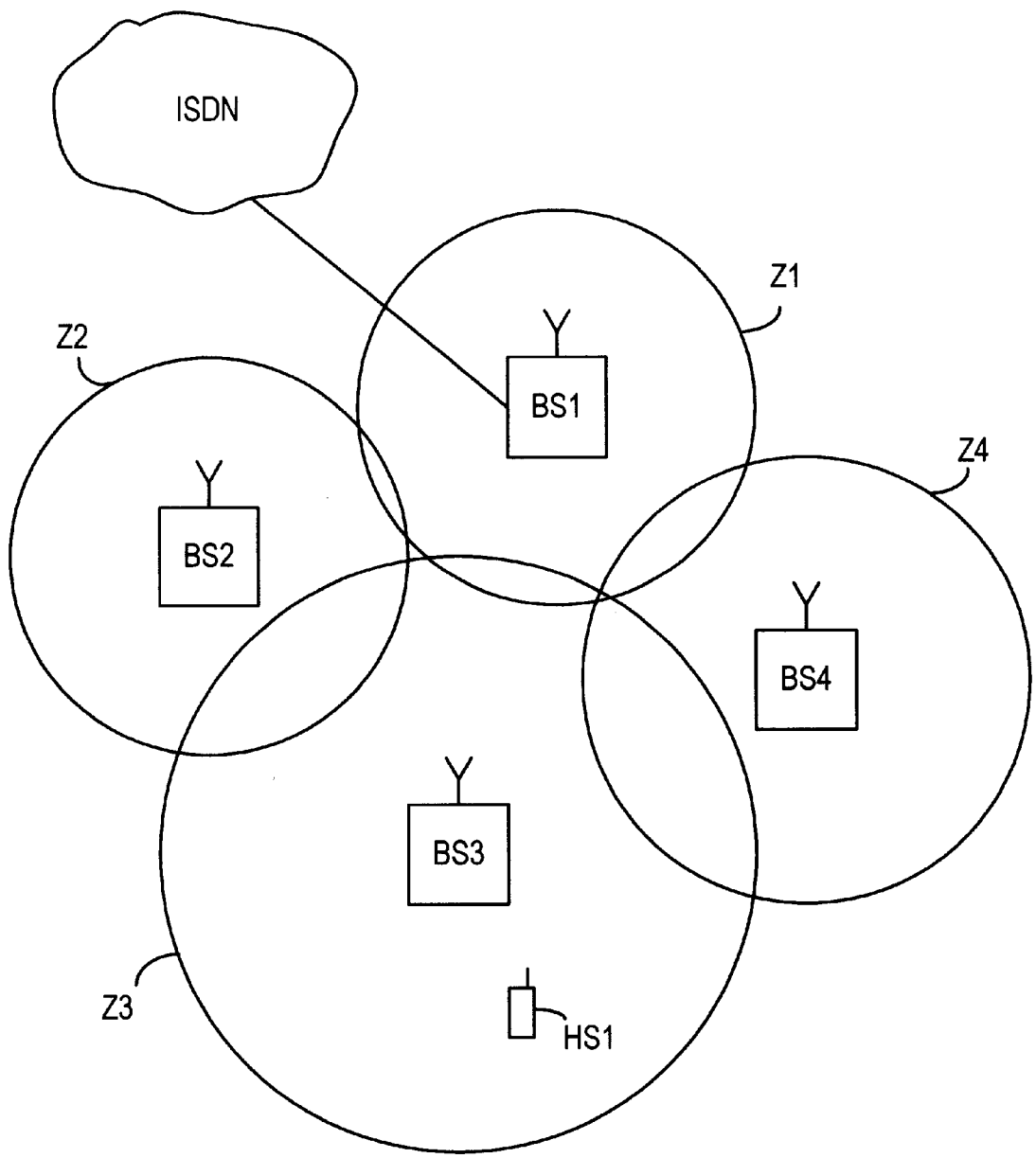
FIG. 1 is a schematic illustration of a cellular radio system with a link to a telecommunications network.

The invention is first explained by means of FIG. 1. According to FIG. 1 a cellular radio system comprises an ISDN facility which performs switching functions and provides a number of service features.

The ISDN network, a fixed digital network, is chosen as the facility. The cellular radio system furthermore contains a number of base stations BS1, BS2, BS3, BS4.

Cordless terminals are assigned to each base station. Only one cordless terminal HS1 is illustrated for reasons of clarity; it is assigned to the first base station BS1. Of the number of base stations BS1, DS2, BS3, BS4 at least one, in this case base station BS1, is connected to the ISDN facility. In the present configuration example the base station BS1 is connected to the ISDN network. Each base station supplies one cell Z1, Z2, Z3, Z4, in which a cordless terminal can access the corresponding base station via a radio channel. A cordless terminal can easily be located within this cell in accordance with its assignment to its base station. In the present case this means that the cordless terminal HS1 is registered in the area of cell Z1 of base station BS1 and can also be found there. Each base station BS1, BS2, BS3, BS4 provides a number of radio channels.

In the present configuration example a first base station BS1 is arranged next to each other base station BS2, BS3, BS4. This means that the cell Z1 which is supplied and therefore covered by the base station BS1 is arranged next to or overlapping the other covered cells Z2, Z3 or Z4. In the present example the base station is a DECT network base station. Every base station in a DECT network provides 12 radio channels. A radio channel from a first base station is used to connect neighboring base stations to each other and signalling to the next base station is carried out in that way. By means of the link between neighboring base stations, a cordless terminal which is not assigned to such base stations can therefore also access the ISDN facility via said base stations. This provides several advantageous applications as explained in the following.

A call for a subscriber arrives via a public network, e.g. the ISDN network. Since there is a dedicated connection between the ISDN network and a first base station BS1, incoming calls are always routed to the base station BS1 which covers the cell Z1. This base station BS1 has a cordless terminal HS1 assigned to it.

In the event when this cordless terminal HS1 is not located within the area of cell Z1 of base station BS1, an idle radio channel which is provided by the base station BS1 is used to establish a connection to another base station, in this case base station BS2 for example. This connection is used to search the cell Z2, which is supplied by this second base station BS2, for the presence of the cordless terminal HS1. If the cordless terminal HS1 is not located in the area of this cell Z2, the connection is broken off and the base station BS1 establishes a connection to the next adjacent base station BS3 via a radio channel.

In the case described here the cordless terminal HS1 is located in the range of base station BS3. The cordless terminal HS1 which was found in the range of base station BS3 is now connected to the ISDN network via base station BS3 and base station BS1. In this way the incoming call can be routed to the cordless terminal HS1.

A similar process takes place with an outgoing call. A subscriber with a cordless terminal HS1 wants to make a call. However he is located in the area of base station BS3. Accordingly a radio channel is established from the cordless terminal HS1 to the base station BS3. The base station BS3, which by itself has no link to the ISDN network, establishes a connection to the base station BS1 which, as explained earlier, provides a link to the ISDN network.

Figure 2:
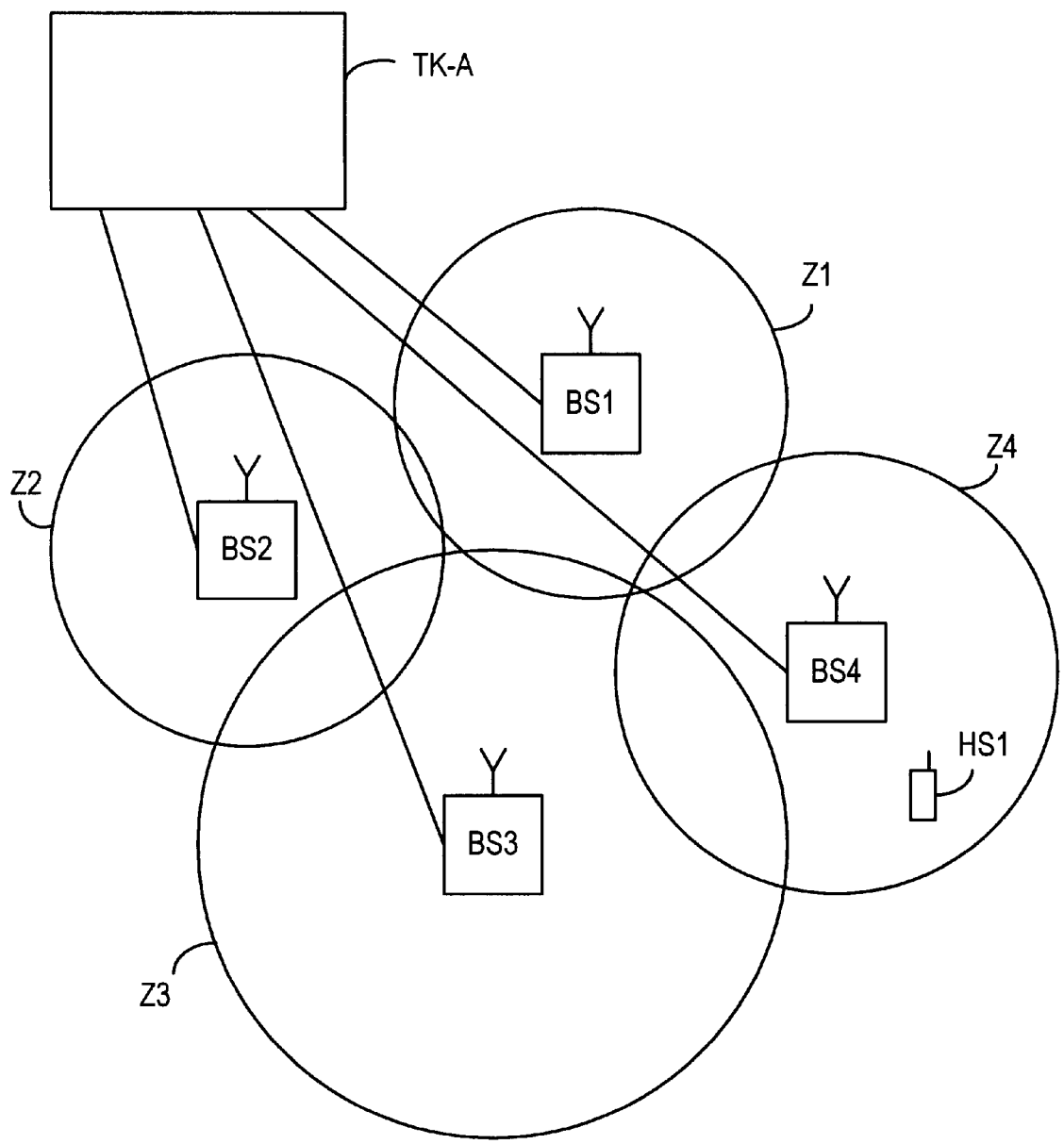
FIG. 2 is a schematic illustration of a cellular radio system with a link to a telecommunications facility.

The following explains a further configuration example by means of FIG. 2. It describes how a cellular radio system looks when it is connected to a telecommunications facility TK-A. According to FIG. 2, every one of the base stations BS1, BS2, BS3, BS4 is connected to the telecommunications facility TKA. A cordless terminal HS1, which in this instance is only drawn as an example, is assigned to a first base station BS1. Each one of the base stations supplies a cell Z1, Z2, Z3, Z4. The cordless terminal HS1 is located in the area of cell Z4 which is supplied by the fourth base station BS4. In the event of an incoming call, the cordless terminal HS1 is first searched for in the cell in which it should be located according to its assignment. In this case it is cell Z1 of the first base station BS1. The cordless terminal HS1 is not found in this cell Z1. A radio channel is now established from the first base station BS1 to a neighboring base station, in this case base station BS2 for example. However the cordless terminal HS1 is not found in the area of base station BS2. For that reason a new radio channel is established to the third base station BS3, but the cordless terminal HS1 is not found there either. A radio channel is then established to the next base station, in this case the fourth base station BS4. The cordless terminal HS1 is located in that area. A service feature provided by the telecommunications facility TK-A is used in the area of this fourth base station BS4. The service feature in this case is the "pickup" of a call. This achieves that the call arriving at the first base station BS1 is picked up by the fourth base station BS4. In this way the cordless terminal HS1 can route a call via the fourth base station BS4. The cordless terminal HS1 is then assigned a temporary number from the cell Z4.

A similar process takes place with outgoing calls. The cordless terminal HS1 which is assigned to the first base station BS1 is located in the area of cell Z4 of the fourth base station BS4. A call is to be made from the cordless terminal HS1. The fourth base station BS4 recognizes that it is a cordless terminal HS1 from another cell, namely a cordless terminal HS1 from cell Z1.

A telecommunications facility TK-A now provides a service feature under the name of "follow-me". This means that a cordless terminal HS1 is able to make a call from neighboring base stations in the same way as from its own first base station BS1.

It will be explained in the following that a handover, as is the case with known cellular radio system, can also take place with the cellular radio structure of the invention. A subscriber makes a call via a cordless terminal in the area of a base station. The cordless terminal is located e.g. in the area of the base station to which it is permanently assigned. It may now happen that a subscriber with his cordless terminal goes outside of the area covered by the base station. A so-called handover must then be initiated by the terminal. To that end a connection is established to the neighboring cell or to its base station. This neighboring base station in turn establishes a connection to the previous base station and informs it of all the necessary handover parameters. After the successful establishment of this connection the base station sends out a "ready for handover" message to the cordless terminal. The link to the cordless terminal of the original base station is released and the call now continues via the other base station in the other cell.

Although the present invention requires a number of radio channels this is not a problem since 12 radio channels are available for each DECT base station.

What is claimed is:

1. A cellular radio system with a facility (TK-A; ISDN) which performs switching function and makes available a plurality of service features, with a plurality of base stations (BS1, BS2, BS3, BS4) which have cordless terminals (HS1) assigned to them, and at least one of which is connected to the facility (TK-A, ISDN), wherein each base station (BS1, BS2, BS3, BS4) makes available a plurality of radio channels in order to provide a direct link between neighboring base stations, and wherein a connection between neighboring base stations (BS1, BS2, BS3, BS4) via one of the radio channels is used for the cordless terminal (HS1) to access the facility (TK-A, ISDN) via those base stations to which the cordless terminal (HS1) is not assigned, regardless of whether those base stations to which the cordless terminal (HS1) is not assigned are connected to the facility.

2. A cellular radio system as claimed in claim 1, wherein a connection to the facility (TK-A; ISDN) is established via the connection to neighboring base stations (BS1, BS2, BS3, BS4).

3. A cellular radio system as claimed in claim 2, wherein the facility (TK-A; ISDN) is a private branch exchange.

4. A cellular radio system as claimed in claim 2, wherein the facility (TK-A; ISDN) is an interface circuit arrangement to an ISDN network.

5. A cellular radio system as claimed in claim 4, wherein the base stations (BS1, BS2, BS3, BS4) are base stations of a DECT system.

6. A cellular radio system as claimed in claim 1, wherein the facility (TK-A; ISDN) is a private branch exchange.

7. A cellular radio system as claimed in claim 1, wherein the facility (TK-A; ISDN) is an interface circuit arrangement to an ISDN network.

8. A cellular radio system as claimed in claim 1, wherein the base stations (BS1, BS2, BS3, BS4) are base stations of a DECT system.

* * * * *